UNITED STATES PATENT OFFICE.

ORAZIO LUGO, OF NEW YORK, N. Y.

SECONDARY BATTERY.

SPECIFICATION forming part of Letters Patent No. 396,214, dated January 15, 1889.

Original application filed June 20, 1888, Serial No. 277,673. Divided and this application filed September 4, 1888. Serial No. 284,559.

(No specimens.)

*To all whom it may concern:*

Be it known that I, ORAZIO LUGO, a citizen of the United States, residing in New York, county of New York, and State of New York, have made a new and useful invention in Secondary or Polarization Batteries, of which the following is a specification.

My invention relates to improvements in that branch of the electrical art known as "secondary" or "polarization" batteries, which are first charged from some extraneous electrical source and then connected to the translating devices it is desired to operate by electricity.

To this end it consists, first, in a novel substance designed for use around or in contact with the electrodes of the battery, or itself constituting the electrodes, said substance being of such a nature that when the poles or electrodes of the battery are connected to a charging source of the required electromotive force the gases evolved electrolytically at said poles or electrodes or through said substance will be occluded or absorbed as such—that is to say, oxygen will be developed and absorbed or occluded at the same moment at the anode or positive pole and hydrogen will be developed and absorbed or occluded at the cathode or negative pole without detrimental resulting chemical action upon the substance itself or the electrode.

It consists, second, in a novel battery constructed with gas occluding or absorbing electrodes of the character or nature hereinafter described and claimed, said electrodes being immersed in an electrolyte.

Prior to my invention it was old in the art to decompose an electrolytic fluid into its constituent gases—oxygen and hydrogen—and to store the gases so decomposed in independent vessels and then recombine these gases, thereby reconverting them into their original or combined state, and at the same time producing an electrical current. This type of battery is known in the art as a "gas-battery," and I make no claim to the broad idea of such a construction or to the processes involved in its use; nor do I claim in this application either the novel method or process of preparing the substance covered by the first statement of the invention above noted, nor the process of storing or occluding electrolytically-developed gases adapted to be recombined or reconverted into their original form, and by such reconversion to produce or generate electricity, said features constituting the subject-matter of a separate application for a patent filed by me in the United States Patent Office on the 20th day of June, 1888, Serial No. 277,673, of which application the present is a division, and only described here in order that a full understanding may be had of the construction or development of the battery which I have invented.

I am also aware that it is old to construct secondary or polarization batteries with gas occluding or absorbing electrodes, and I make no claim, therefore, to such feature broadly.

My improvement lies in the several features above indicated and hereinafter described and claimed.

In order that my invention may be fully understood, I will now proceed to describe the best processes and means known and employed by me at present for putting it into practical use.

I first prepare as one of the occluding substances an allotropic material, preferably allotropic or finely-divided or spongy lead. This allotropic material is produced by a novel process, which I will describe later on. I then immerse this material in a bath or solution of such a metallic salt as will precipitate the metal of the salt upon the whole spongy surface of the allotropic or finely-divided material. This material, when so prepared with two occluding elements superposed upon each other, constitutes the gas occluding or absorbing substance and is indestructible under the electric action of charging or discharging. It is not only indestructible, but has also the property of occluding or absorbing much greater quantity of the gases than if constituted of the same weight of a single occluding element of metal, this property being somewhat analogous to that of alloys and their separate elementary metals in metallurgy. While this substance, which is also amorphous, has the property of occluding or absorbing such gases as oxygen and hydrogen when evolved through itself, it will not be oxidized by the nascent oxygen or reduced to a different form by the nascent hydrogen or acted upon by any of the combinations which hydrogen and oxygen in their nascent state may form—such, for instance, as peroxide of hydrogen.

I will now describe in detail the entire procedure involved in the preparation of my improved gas-occluding material and its application and use in a secondary or polarization battery, taking as a type those elementary substances which appear to me to give the best results and at the same time be produced at a minimum cost.

I first prepare one of the allotropic materials, preferably spongy or porous lead, as follows: I take two or three chemical equivalents of chloride of sodium (NaCl) and mix them in a dry pulverized state with one chemical equivalent of acetate of lead ($PbO.C_4H_4O_4$). I then dampen the mixture and mix it still further, after which I dissolve it in water. This mixing process is carried on preferably in a vessel having a lead lining. Metallic zinc (Zn) is now suspended or immersed in this solution, and the following reaction takes place. The act of mixing the acetate of lead ($PbO.\bar{A}$) and chloride of sodium (NaCl) forms acetate of soda ($NaO.\bar{A}$) and chloride of lead (PbCl.) The excess of the chloride of sodium (NaCl) in the mixture after the formation of acetate of soda and chloride of lead (PbCl) acts as a solvent of the chloride of lead, (PbCl,) and when the zinc is immersed in the solution the chlorine (Cl) of the chloride of lead (PbCl) acts upon the zinc, (Zn,) thereby forming chloride of zinc (ZnCl) and at the same time depositing metallic lead (Pb) on the surface of the zinc, ($Zn_2$) said metallic lead being in an extremely divided or spongy or allotropic condition. When this reaction is completed, the mother liquid is withdrawn and a diluted solution of sulphate of copper ($CuO.SO_3$) is introduced into the vessel containing the allotropic or spongy lead. The introduction of this sulphate of copper causes metallic copper to be deposited upon the surface of the divided or spongy lead. This substance produced by the precipitation of the copper upon the exceedingly finely-divided lead, which division approaches very closely to atomic division, is now bimetallic in its nature, and is in such a state of chemical equilibrium as to resist either oxidation or change of form due to contact only, in contradistinction to a combined state such as exists in an alloy of two metals; or, in other words, their chemical affinities are entirely satisfied by contact, so that no difference in electrical potential exists between these metals, and therefore in this case no oxidation or change of form can take place. This substance is now pressed sufficiently to remove the excess of liquid or the solution remaining in it, and is ready for use in the battery. In practice I pack it tightly around the electrodes, consisting of metallic or metalloid plates located in porous jars, said plates having the usual binding-posts and connections. Both electrodes so constructed are then immersed in an electrolytic solution, preferably dilute sulphuric acid, ($SO_3$.) I do not, however, limit myself to any special construction of electrode or to any special combination of this improved gas absorbing or occluding substance with any special kind of electrode or electrolyte, as it may be used with any such form or construction as may suggest itself, or may be used as an electrode *per se* when connected directly to the poles of the battery and with usual electrolytes. Nor do I limit myself to the special metallic salts herein named from which this substance or material is composed, as it is obvious other metallic salts may be used—as, for example, acetate of silver ($AgO.\bar{A}$) may supplant the lead salt, from which reaction allotropic or spongy or finely-divided metallic silver will result. Other metallic salts having the properties of the two metallic salts named may of course be used instead. Instead of the solution of sulphate of copper from which metallic copper is deposited on the allotropic lead, I may substitute a salt of nickel or any other metallic salt which when used would deposit the metal of the salt upon the allotropic lead or silver or other material used.

The operation of my improved battery is at once obvious, as in charging oxygen is generated at the anode and absorbed by the occluding or absorbing substance, hydrogen being generated and occluded or absorbed at the cathode. After the battery is fully charged, which will be determined when it begins to give off the free oxygen and hydrogen gases in natural state, the absorbing material refusing to take more than its occluding capacity, it may be disconnected from the charging source and used in the well-known manner.

I have found that such a battery may stand for months and lose none of its charge, the gases being held securely in their occluded or absorbed state, and no chemical action being noticeable in the cell, the action being purely physical in its nature.

Having thus described my invention, what I claim, and desire to secure by Letters Patent of the United States, is—

1. The described gas-absorbent for use in storage or polarization batteries, consisting of superposed allotropic materials, substantially as described.

2. An absorbent or occluding substance for use in secondary or polarization batteries, consisting of finely-divided or allotropic metals superposed upon each other, substantially as described.

3. The described absorbent or occluding substance for polarization or secondary batteries, consisting of finely-divided material of atom-like nature, each atom or divided portion being entirely covered by a coating of an independent material, substantially as described.

4. The described absorbent or occluding substance for the gases generated in secondary or polarization batteries, consisting of finely-divided or allotropic or spongy lead, each particle of which is coated or covered with allotropic or finely-divided or spongy copper, substantially as described.

5. An electrode for a secondary or polarization battery, consisting of atom-like material adapted to absorb or occlude the gases evolved in charging, substantially as described.

6. A secondary or polarization battery having electrodes composed of atom-like material adapted to occlude or absorb the gases evolved in charging, substantially as described.

7. A secondary or polarization battery having electrodes of atom-like material immersed in an electrolytic fluid, substantially as described.

8. A secondary or polarization battery having electrodes of disintegrated atom-like material adapted to absorb or occlude the gas evolved during the process of charging, substantially as described.

9. A secondary or polarization battery having electrodes of atom-like material packed around conducting plates or surfaces and immersed in an electrolytic fluid, substantially as described.

10. A secondary or polarization battery having electrodes of atom-like material packed in porous jars or cups located in an electrolytic fluid, substantially as described.

11. A secondary or polarization battery having electrodes composed of atom-like material packed around conducting plates or surfaces contained in porous jars, said jars being immersed in an electrolytic fluid, substantially as described.

ORAZIO LUGO.

Witnesses:
 C. J. KINTNER,
 J. F. QUINN.